Nov. 15, 1960   A. W. GAUBATZ   2,960,327
SPEED SWITCH ACTUATING MECHANISM
Filed March 9, 1959
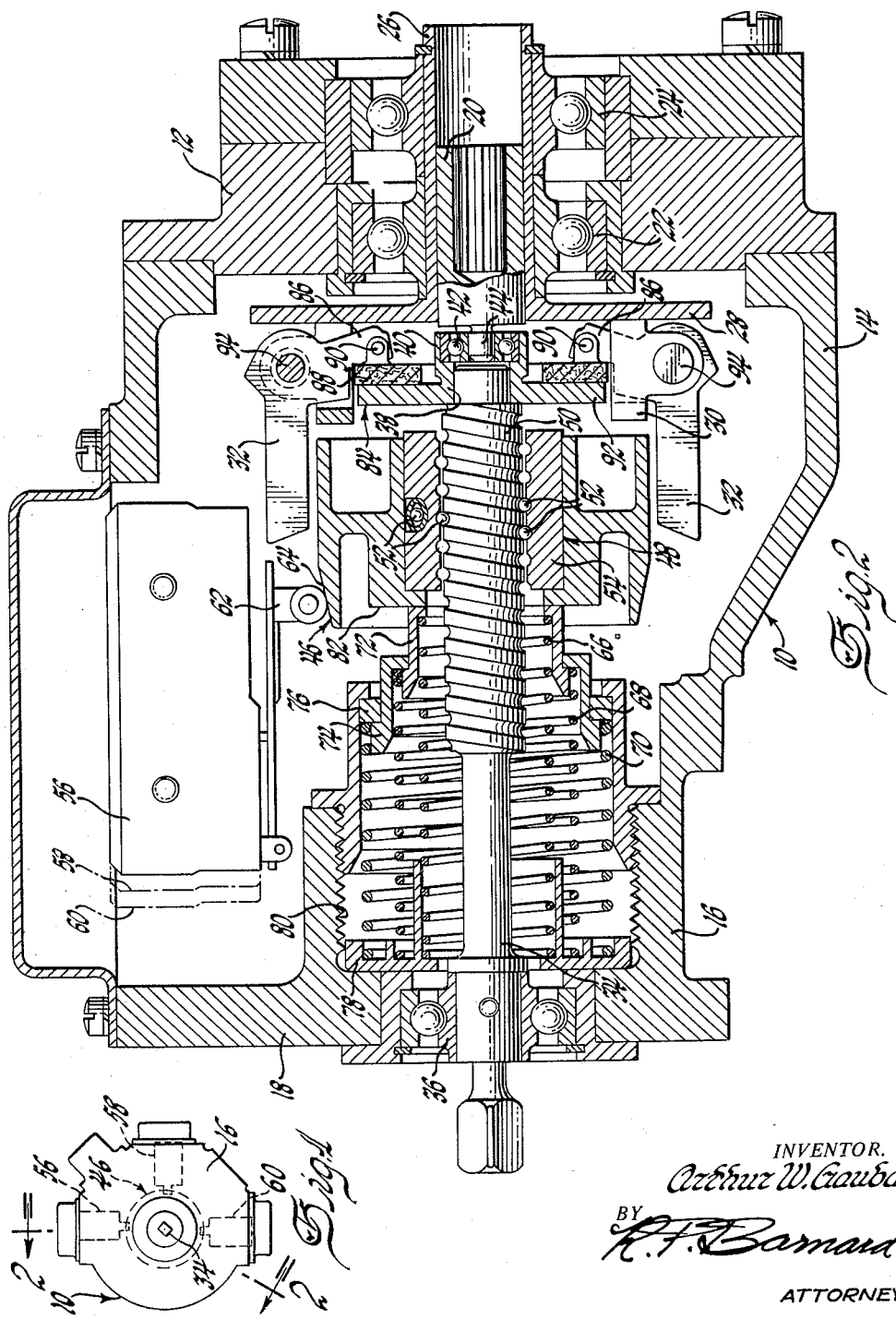
INVENTOR.
Arthur W. Gaubatz
BY
R. F. Barnard
ATTORNEY United States Patent Office 2,960,327
Patented Nov. 15, 1960

2,960,327

SPEED SWITCH ACTUATING MECHANISM

Arthur W. Gaubatz, Indianapolis, Ind., assignor to General Motors Corporation, Detroit, Mich., a corporation of Delaware Filed Mar. 9, 1959, Ser. No. 798,254

8 Claims. (Cl. 200—80)

This invention relates to a control apparatus utilizing a centrifugal governor for sequentially actuating a plurality of electrical switches or other control elements in accordance with the speed of rotation of an engine or other rotating agency.

More specifically, the present invention is an improvement over Patent 2,786,667 Gaubatz. In the device shown in the Gaubatz patent, the control apparatus employs centrifugally actuated flyweights which are revolved by a rotating shaft to transmit an axial thrust to adjust the position of an axially movable non-rotatable sleeve member. The sleeve member is provided with a cam surface for sequential engagement with a plurality of axially staggered microswitches or equivalent control elements and is also provided with a surface for sequential engagement with a plurality of concentric non-rotating balance springs with individually determine the cut-in points of the microswitches.

The subject improvement relates to the interposition of a clutch and screw mechanism between the flyweights and the switch-actuating sleeve. By interposing the clutch-screw mechanism the only work that the flyweights must do is to actuate the clutch and the actual sleeve movement for actuating the microswitches is supplied by the engine shaft or other instrumentality driving the overall switch mechanism. By reducing the work which the flyweights must do, considerable hysteresis in the actuation of the sequential microswitches is eliminated resulting in more prompt and accurate control by the speed switch mechanism.

The details as well as other objects and advantages of the present invention will be apparent from a perusal of the detailed description which follows.

In the drawings:

Figure 1 is an end elevational view of the subject speed switch mechanism; and

Figure 2 is a partially sectioned elevational view of the subject mechanism.

The speed switch mechanism includes a housing 10 and a centrally apertured end cover 12 detachably secured thereto. Housing 10 has several substantially circular sections along its length including an enlarged portion 14 and a reduced portion 16 having a centrally apertured flange 18 by which the housing is mounted on an engine or other rotation imparting device. A shaft 20 is supported for rotation by ball bearings 22 and 24 and is adapted to be driven by the associated engine. A sleeve 26 is fixed for rotation with shaft 20 and includes a radially extending flange 28 mounted at the inner end thereof.

Brackets 30 are mounted on sleeve flange 28 and are adapted to pivotally support flyweights 32 thereon.

A second shaft 34 is coaxially disposed with respect to shaft 20 and is supported at one end upon bearing 36 which in turn is mounted in housing flange 18. A sleeve 38 is fixed to the other end of shaft 34 and extends axially toward shaft 20 to provide a portion 40 which supports the outer race of a bearing member 42. The inner race of bearing 42 is mounted upon an extension 44 of shaft 20. Thus the right end of shaft 34 is supported upon shaft 20 and the latter is adapted to rotate relative thereto.

A sleeve member 46 is concentrically mounted on shaft 34 in axially movable relation thereto by a screw mechanism indicated generally at 48. Screw mechanism 48 is shown and described in detail in Patent 2,267,524 Hawkins and will herein be described only in sufficient detail to render clear the operation of the subject speed switch mechanism.

A part of screw mechanism 48 includes a threaded section 50 formed on shaft 34 and the convolutions of which screw portion are adapted to coact with ball bearing members 52 confined by a sleeve or nut member 54 having convolutions similar to those in screw portion 50. Sleeve 46 is fixed to nut 54 whereby upon rotation of shaft 34, nut 54 and hence sleeve 46 will move axially relative to the shaft. Screw mechanism 48 is preferred due to its extremely low frictional resistance and corresponding high efficiency in translating the rotary shaft movement into axial movement of the nut 54.

Before referring to the main part of the subject invention which includes the means whereby the rotary movement of shaft 20 is transmitted to shaft 34 to move sleeve 46 axially, it will be helpful to first consider the remainder of the switch mechanism. A plurality of control elements such as conventional microswitches 56, 58 and 60 are secured in housing 10. The switches are relatively displaced axially of sleeve 46 as may be seen by their dotted out-of-position outlines in the drawing. Each microswitch includes a switch actuating arm 62 actuated in succession by the axial movement and engagement with cam surface 64 of sleeve 46. The microswitches may be arranged to complete separate electrical control circuits on engagement or disengagement by sleeve cam surface 64 as desired. In the illustrated embodiment of the invention, each of the microswitches is a single pole, double throw type which completes a separate electrical circuit when its actuating arm is displaced radially outwardly by engagement with sleeve cam surface 64.

Microswitches 56, 58 and 60 are respectively low speed, intermediate speed and high speed switches adapted to be actuated at speeds set by the individual adjustment of their respective balance springs; for example, at shaft speeds of 2,000, 3,000 and 4,000 r.p.m.

Axial movement of sleeve 46 and nut 54 is yieldably opposed in successive increments by a low speed balance spring 66, an intermediate balance spring 68 and a high speed balance spring 70. The balance springs are concentrically arranged around shaft 34 and are supported at one end by a plurality of concentric end rings 72, 74 and 76 which are slidably supported within each other. The other ends of the balance springs are supported by a common seat member 78 axially adjustably supported within a threaded portion 80 of casing 16. If preferred, the balance springs may be seated on individually adjustable members as shown in the aforenoted Gaubatz patent. The actuation of the microswitches may be varied by adjusting seat member 78 axially with respect to casing portion 80.

As sleeve and nut 46 and 54 shift to the left with increasing r.p.m., radial surface 82 of sleeve 46 will simultaneously engage ring 72 of the low speed balance spring 66 and the actuating arm 62 of the low speed microswitch 56. Sleeve 46 will then remain stationary until the r.p.m. increases to an extent sufficient to overcome the pre-loading of the low speed balance spring 66 whereon the sleeve will shift to simultaneously engage the end ring 74 of the intermediate speed balance spring 68 and the operating arm of the intermediate speed microswitch 58. With further increasing r.p.m., sleeve 46 will successively actuate the intermediate and high speed microswitches 58 and 60 as the pre-loading of their balance springs 68 and 70 is overcome.

As already noted, heretofore the force for axially moving sleeve 46 has been provided by the flyweights 32 as seen in the aforenoted Gaubatz patent. The main disadvantage of the earlier construction is the hysteresis in the actuation of the microswitches due to the necessity of the flyweights having to provide the requisite force to overcome balance springs. To obviate these difficulties in the present mechanism, a clutch mechanism indicated generally at 84 has been interposed between flyweights 32 and sleeve 46 which in combination with screw mechanism 48 provides a switch actuating mechanism in which the force utilized to overcome the balance springs is provided directly by the power source driving input shaft 20.

Referring now more specifically to clutch mechanism 84, it is to be noted that each of the flyweights 32 includes arms 86 adapted to articulably support a washer-like clutch plate member 88 through pins 90. Clutch plate member 88 is adapted to be loosely articulated to flyweight arms 86 so as to assume a generally radial position with respect to the axes of shafts 20 and 34 irrespective of the angular disposition of the flyweights. A similar clutch plate member 92 is formed on sleeve 38 fixed to shaft 34. The position of clutch plates 88 and 92 are so arranged in relation to flyweights 32 that when the speed of input shaft 20 is below the value at which it is desired to begin actuation of the microswitches, the plates will be out of engagement and shaft 20 will rotate relative to shaft 34. As a result, there will be no axial movement of nut 54 and sleeve 46.

As r.p.m. increases the pivoting movement of flyweights 32 about their pivots 94 will cause plate 88 to be moved axially into engagement with plate 92 to impart a driving or rotative movement to shaft 34. Rotation of shaft 34 will, in turn, cause nut 54 and sleeve 46 to begin moving axially toward rings 72, 74 and 76. As long as the frictional drag between clutch plates 88 and 92 exceeds the frictional drag of nut mechanism 48, axial movement of the nut will continue. In general the helix angle of screw portion 50 is selected to insure that the drag of friction clutch 84 is always greater than that of the screw. However, to the drag of screw mechanism 48 must be added the drag imposed thereon by the spring biased rings 72, 74 and 76 as they progressively engage with surface 82 of sleeve 46.

In operation, as flyweights 32 move radially outwardly to cause the clutch plates 88 and 92 to transmit drive between shafts 20 and 34, nut 54 will move axially along screw 50 until the frictional drag of the rings 72, 74 and 76 severally or together coupled with the drag of screw mechanism 48 exceeds the frictional drag between the clutch plates at which time clutch 84 will begin to slip and axial movement of the nut and sleeve 54 and 46 will cease. Thereafter as r.p.m. further increases to urge plate 88 into tighter engagement with plate 92 the frictional drag of each of the rings 72, 74 and 76 will be progressively overcome to occasion sufficient axial movement of sleeve 46 to ultimately actuate all of the microswitches 56, 58 and 60. Thus intermittent axial drive will be imparted to sleeve 46 in accordance with the radial movement of flyweights 32 and the drag resistance sequentially imposed on clutch 84 by nut mechanism 48 and spring biased rings 72, 74 and 76.

Clutch 84 is adapted to be lubricated by any suitable means such as that shown in copending application S.N. 769,133 Gaubatz, filed October 23, 1958, now Patent No. 2,926,900. In general clutch 84 possesses the characteristics of a plain thrust bearing.

I claim:

1. A speed controlled apparatus of the type including a plurality of axially spaced control devices adapted to be sequentially actuated by an axially movable sleeve member and speed responsive means for actuating said sleeve member, in which the speed responsive means comprises first and second coaxially disposed rotatable shafts, a plurality of spring means adapted to be sequentially engaged by the axial movement of said sleeve member to limit actuation of said devices, said spring means creating a frictional drag tending to restrain axial movement of the sleeve, a plurality of flyweight members pivotally mounted on one of said shaft members, means operatively connecting said sleeve to the other of said shaft members whereby rotative movement of said other shaft member will impart axial movement to said sleeve member, the flyweight actuating shaft member being rotatable relative to said other shaft member, and clutch means intermediate said first and second shaft members, said flyweights being adapted to actuate said clutch means to couple said shaft members to rotate said other shaft member when the clutch means overcomes the frictional drag of said spring means tending to resist axial movement of said sleeve member.

2. A speed controlled apparatus of the type including a plurality of axially spaced control devices adapted to be sequentially actuated by an axially movable sleeve member and speed responsive means for actuating said sleeve member, in which the speed responsive means comprises first and second coaxially disposed rotatable shafts, a plurality of spring means adapted to be sequentially engaged by the axial movement of said sleeve member to limit actuation of said devices, said spring means creating a frictional drag tending to restrain axial movement of the sleeve, a plurality of flyweight members pivotally mounted on one of said shaft members, nut and screw means operatively connecting said sleeve to the other of said shaft members whereby rotative movement of said other shaft member will cause the nut and sleeve to move axially of said screw, the flyweight actuating shaft member being rotatable relative to said other shaft member, and clutch means intermediate said first and second shaft members, said flyweights being adapted to actuate said clutch means to couple said shaft members to rotate said other shaft member when the clutch means overcomes the frictional drag of said spring means tending to resist axial movement of said sleeve member.

3. A speed controlled apparatus as set forth in claim 2 in which the nut and screw means comprises convolutions formed on said other shaft, similar convolutions formed on the nut and a plurality of ball bearing members coacting with the nut and shaft convolutions to impart axial movement to the nut as said other shaft is rotated.

4. A speed controlled apparatus of the type including a plurality of axially spaced control devices adapted to be sequentially actuated by an axially movable sleeve member and speed responsive means for actuating said sleeve member, in which the speed responsive means comprises first and second coaxially disposed rotatable shafts, a plurality of concentrically disposed springs, annular rings urged axially toward said sleeve by said springs, said rings being adapted to be sequentially engaged by the axial movement of said sleeve member to limit actuation of said devices, a radially disposed ring engaging surface formed on said sleeve, said spring biased annular rings creating a frictional drag on the radial surface of said sleeve tending to restrain axial movement of said sleeve, a plurality of flyweight members pivotally mounted on one of said shaft members, means operatively connecting said sleeve to the other of said shaft members whereby rotative movement of said other shaft member will impart axial movement to said sleeve member, the flyweight actuating shaft member being rotatable relative to said other shaft member, and clutch means intermediate said first and second shaft members, said flyweights being adapted to actuate said clutch means to couple said shaft members to rotate said other shaft member when the clutch means overcomes the frictional drag of said annular rings tending to resist axial movement of said sleeve member.

5. A speed controlled apparatus as set forth in claim 2 in which said clutch means comprises a first annular plate element fixed to said other shaft member, and a second annular plate element rotatable with said one shaft member and disposed proximate said first plate element, said second plate element being articulated to said flyweight members and movable axially into engagement with the first element as the rotative speed of said flyweight members increases.

6. A speed controlled apparatus of the type including a plurality of axially spaced control devices adapted to be sequentially actuated by an axially movable sleeve member and speed responsive means for actuating said sleeve member, in which the speed responsive means comprises first and second coaxially disposed rotatable shafts, a plurality of concentrically disposed springs, annular rings urged axially toward said sleeve by said springs, said rings being adapted to be sequentially engaged by the axial movement of said sleeve member to limit actuation of said devices, a radially disposed ring engaging surface formed on said sleeve, a plurality of flyweight members pivotally mounted on one of said shaft members, nut and screw means operatively connecting said sleeve to the other of said shaft members whereby rotative movement of said other shaft member will cause the nut and sleeve to move axially of said screw, the flyweight actuating shaft member being rotatable relative to said other shaft member, and clutch means intermediate said first and second shaft members, said flyweights being adapted to actuate said clutch means to couple said shaft members to rotate said other shaft member when the frictional drag of said clutch means overcomes the frictional drag of said spring means tending to resist axial movement of said sleeve member.

7. A speed controlled apparatus as set forth in claim 6 in which the spring biased annular rings and the ring engaging surface are so arranged that the frictional drag imposed on the nut and screw means as each ring is successively engaged by said sleeve surface will cause the clutch means to slip interrupting the axial movement of said sleeve unitl the rotative speed of the flyweights increases to increase the frictional drag of the clutch means sufficiently to re-establish drive between said shaft members.

8. A speed controlled apparatus of the type including a plurality of axially spaced control devices adapted to be sequentially actuated by an axially movable sleeve member and speed responsive means for actuating said sleeve member, in which the speed responsive means comprises a rotatable shaft coaxially related to said sleeve, a plurality of spring means adapted to be sequentially engaged by the axial movement of said sleeve member to limit actuation of said device, a plurality of flyweight members pivotally associated with and rotatably driven by said shaft, rotatable means for moving said sleeve axially, and a clutch mechanism operable by said flyweight members and adapted to couple said rotatable means with said shaft, said spring means engaging said sleeve creating a frictional drag tending to restrain the rotatable means against rotation, said clutch mechanism being adapted to frictionally engage and rotatively drive the rotatable means when the clutch mechanism overcomes said frictional drag.

References Cited in the file of this patent

UNITED STATES PATENTS

| | | |
|---|---|---|
| 485,361 | Waters | Nov. 1, 1892 |
| 1,058,594 | Karshner | Apr. 8, 1913 |
| 1,524,445 | Manicki | Jan. 27, 1925 |
| 2,267,524 | Hawkins | Dec. 23, 1941 |
| 2,786,667 | Gaubatz | Mar. 26, 1957 |